(12) United States Patent  
Karabinis et al.

(10) Patent No.: US 8,190,114 B2
(45) Date of Patent: May 29, 2012

(54) FREQUENCY-DEPENDENT FILTERING FOR WIRELESS COMMUNICATIONS TRANSMITTERS

(75) Inventors: Peter D. Karabinis, Cary, NC (US); Santanu Dutta, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 1259 days.

(21) Appl. No.: 11/457,881

(22) Filed: Jul. 17, 2006

(65) Prior Publication Data

US 2007/0021059 A1    Jan. 25, 2007

Related U.S. Application Data

(60) Provisional application No. 60/700,928, filed on Jul. 20, 2005.

(51) Int. Cl.
  *H04B 1/10*    (2006.01)
(52) U.S. Cl. ...... 455/307; 455/63.1; 455/77; 455/114.2; 455/296; 455/338; 455/339; 370/497; 370/290; 370/291; 379/406.08; 379/390.02
(58) Field of Classification Search .................. 455/63.1, 455/77, 114.2, 296, 307, 338, 339, 67.13; 370/497, 290, 291; 379/406.08, 390.02
  See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |

(Continued)

FOREIGN PATENT DOCUMENTS

EP    0 506 255 A2    9/1992

(Continued)

OTHER PUBLICATIONS

International Search Report and Written Opinion for PCT/US2006/028050; date of mailing Dec. 27, 2006.

(Continued)

*Primary Examiner* — Justin Lee
(74) *Attorney, Agent, or Firm* — Myers Bigel Sibley & Sajovec, P.A.

(57) ABSTRACT

A method of transmitting information in a wireless communications system can be provided by selectively applying filtering to transmission of a carrier signal of a first band of frequencies of a wireless communications system based on a frequency separation distance between a frequency content of the carrier signal and a second band of frequencies allocated to a communications system other than the wireless communications system.

11 Claims, 6 Drawing Sheets

U.S. PATENT DOCUMENTS

| | | | |
|---|---|---|---|
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,154,639 | A * | 11/2000 | Kanazumi et al. ............ 455/74 |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 2001/0018327 | A1 | 8/2001 | Houston et al. |
| 2002/0081987 | A1* | 6/2002 | Yoshida et al. ............ 455/277.1 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0022625 | A1 | 1/2003 | Otten et al. |
| 2003/0054762 | A1 | 3/2003 | Karabinis |
| 2003/0054815 | A1 | 3/2003 | Karabinis |
| 2003/0068978 | A1 | 4/2003 | Karabinis et al. |
| 2003/0078040 | A1* | 4/2003 | Mayfield et al. ............ 455/427 |
| 2003/0092403 | A1* | 5/2003 | Shapira et al. ............ 455/101 |
| 2003/0125065 | A1* | 7/2003 | Barak et al. ............ 455/522 |
| 2003/0149986 | A1 | 8/2003 | Mayfield et al. |
| 2003/0153308 | A1 | 8/2003 | Karabinis |
| 2003/0157905 | A1 | 8/2003 | Holmqvist |
| 2004/0018824 | A1* | 1/2004 | Fang ............ 455/302 |
| 2004/0038693 | A1 | 2/2004 | Niwano |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0240525 | A1 | 12/2004 | Karabinis et al. |
| 2004/0252786 | A1 | 12/2004 | McHenry |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 | 4/2005 | Singh et al. |
| 2005/0090256 | A1 | 4/2005 | Dutta |
| 2005/0118948 | A1 | 6/2005 | Karabinis et al. |
| 2005/0130597 | A1* | 6/2005 | Li et al. ............ 455/67.11 |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |
| 2006/0094352 | A1 | 5/2006 | Karabinis |
| 2006/0094420 | A1 | 5/2006 | Karabinis |
| 2006/0105707 | A1 | 5/2006 | Karabinis |
| 2006/0111041 | A1 | 5/2006 | Karabinis |
| 2006/0135058 | A1 | 6/2006 | Karabinis |
| 2006/0135060 | A1 | 6/2006 | Karabinis |
| 2006/0135070 | A1 | 6/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |
| WO | WO 02/091639 A1 | 11/2002 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

\* cited by examiner

FREQUENCY-DEPENDENT FILTERING FOR WIRELESS COMMUNICATIONS TRANSMITTERS

CLAIM FOR PRIORITY

This application claims priority to U.S. Provisional Patent Application No. 60/700,928; Filed Jul. 20, 2005, entitled Carrier Frequency-Dependent filtering for Cellular Wireless Communications transmitters, the entirety of which is incorporated herein by reference.

FIELD OF THE INVENTION

This invention relates to wireless communications systems and methods, and more particularly to terrestrial cellular and satellite wireless communications systems and methods.

BACKGROUND

Cellular wireless terrestrial and/or satellite communications systems and/or methods are widely used for wireless communications. Terrestrial cellular communications systems and/or methods, for example, generally employ a plurality of base stations that are configured to communicate with a plurality of wireless terminals using terrestrial cellular/PCS and/or satellite frequencies. Satellite communications systems and/or methods generally employ at least one space-based component, such as one or more satellites, that is/are configured to wirelessly communicate with a plurality of wireless terminals using satellite frequencies.

In cellular satellite radioterminal communications systems and/or methods, multiple service link antenna patterns (service link beams or cells) are provided, each of which can serve substantially distinct geographical areas in the overall service region, to collectively serve an overall satellite footprint. Thus, a cellular architecture/pattern similar to that used in conventional terrestrial cellular radioterminal systems and/or methods can be implemented in cellular satellite-based systems and/or methods. The satellite typically communicates with radioterminals over a bidirectional communications pathway, with radioterminal communications signals being communicated from the satellite to the radioterminal over a downlink or forward service link, and from the radioterminal to the satellite over an uplink or return service link.

The overall design and operation of cellular radioterminal systems and methods are well known to those having skill in the art, and need not be described further herein. Moreover, as used herein, the term "cellular radioterminal" includes terrestrial cellular and/or satellite cellular radioterminals with or without a multi-line display; terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) and/or GLONASS receiver; and/or conventional laptop and/or palmtop computers or other appliances, which include a radio frequency transceiver. As used herein, the term "cellular radioterminal" also includes any other radiating user device, equipment and/or source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A cellular radioterminal also may be referred to herein as a "cellular radiotelephone," "cellular terminal" or "cellular wireless user device".

Terrestrial networks can enhance cellular satellite radioterminal system availability, efficiency and/or economic viability by terrestrially using and/or reusing at least some of the frequencies that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into and/or out of buildings. As a result, the satellite spectrum may be underutilized or unutilized in such areas. The use of terrestrial retransmission/reception of at least some of the frequencies that are allocated to the cellular satellite radiotelephone system can reduce or eliminate this potential problem.

The capacity of a hybrid system, comprising terrestrial and satellite-based communications connectivity and configured to terrestrially use and/or reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the communications connectivity/signal(s) of a satellite-only system may be unreliable. As a result, a hybrid (satellite/terrestrial cellular) system that is configured to use and/or reuse terrestrially at least some of the frequencies of the satellite band may become more economically viable, as it may be able to serve more effectively and reliably a larger subscriber base.

Satellite radioterminal communications systems and methods that may employ terrestrial use/reuse of satellite frequencies by an Ancillary Terrestrial Network (ATN) comprising at least one Ancillary Terrestrial Component (ATC) are also described in Published U.S. Patent Application Nos. US 2003/0054760 to Karabinis, entitled Systems and Methods for Terrestrial Ruse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

U.S. Pat. No. 6,785,543 to co-inventor Karabinis, entitled Filters for Combined Radiotelephone/GPS Terminals, describes a satellite radiotelephone system that includes a space-based component, a plurality of ancillary terrestrial components, and a plurality of radiotelephones. The space-based component is configured to provide wireless radiotelephone communications using satellite radiotelephone frequencies. The plurality of ancillary terrestrial components include a plurality of ancillary terrestrial component antennas configured to provide wireless radiotelephone communications using at least one of the satellite radiotelephone frequencies in a radiation pattern that increases radiation below the horizon compared to above the horizon. The plurality of radiotelephones are configured to communicate with the space-based component and with the plurality of ancillary terrestrial components. Each radiotelephone also includes a GPS signal processor and a GPS mode filter that is configured to suppress energy at (1575.42-Δ) MHz, where 0<Δ≦16.42 MHz. Related radiotelephones and methods are also discussed. See the Abstract of U.S. Pat. No. 6,785,543.

SUMMARY

Embodiments according to the invention can provide frequency-dependent filtering for wireless communications transmitters. Pursuant to these embodiments, a method of transmitting information in a wireless communications system can be provided by selectively applying filtering to transmission of a carrier signal of a first band of frequencies of a wireless communications system based on a frequency separation distance between a frequency content of the carrier signal and a second band of frequencies allocated to a communications system other than the wireless communications system.

In some embodiments according to the invention, a communications circuit in an Ancillary Terrestrial Component (ATC) of a wireless communications system includes a transmitter circuit that is configured to selectively filter transmission of a carrier signal for a first band of frequencies based on a frequency separation distance between a frequency content of the carrier signal and a second band of frequencies allocated to a communications system other than the wireless communications system.

In some embodiments according to the invention, a transmitter circuit in an Ancillary Terrestrial Component of a wireless communications system includes a power amplifier circuit that is configured to amplify radiofrequency communications signals for transmission. A filter circuit is configured to filter the transmission of the carrier signal when coupled to the power amplifier circuit. A switch circuit is coupled to an input and/or output of the filter circuit. An antenna is coupled to the output of the filter circuit and/or the power amplifier circuit and a control circuit is coupled to the switch circuit, where the control circuit is configured to operate the switch based on a frequency content of a carrier signal transmitted by the transmitter circuit.

DESCRIPTION OF EMBODIMENTS ACCORDING TO THE INVENTION

Figure 1:
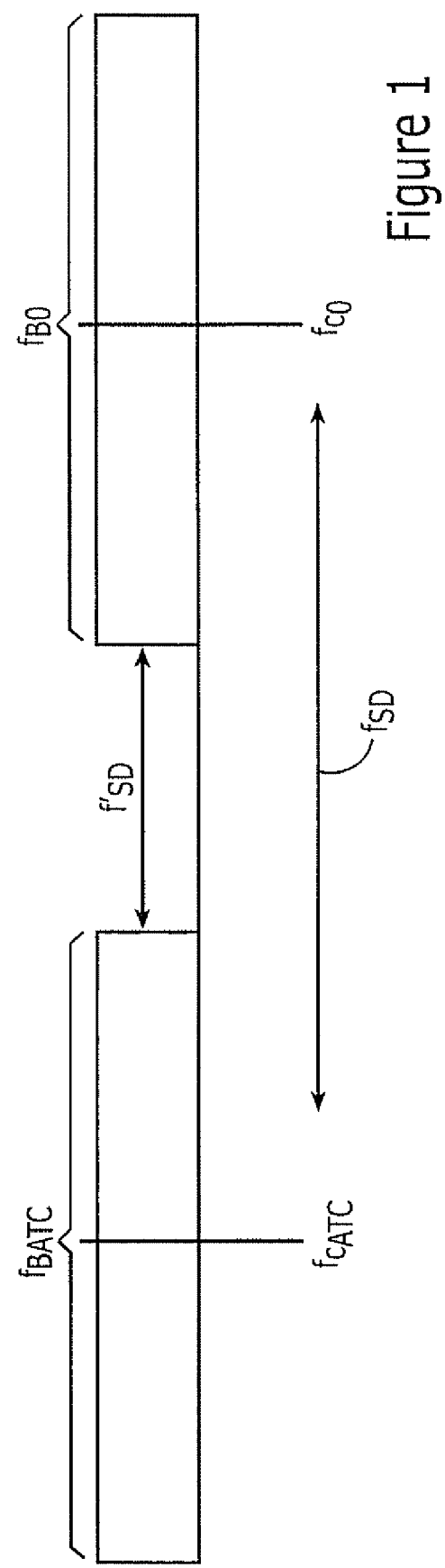
FIG. 1 is a schematic illustration of first and second frequency bands used by a wireless communications system and another system according to some embodiments of the invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will, be thorough and complete, and will hilly convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Exemplary embodiments of the present invention provide cellular communications transmitters and/or non-cellular communications transmitters that may be configured to selectively use a filter responsive to a frequency content of a signal that the cellular and/or non-cellular communications transmitter transmits. The cellular and/or non-cellular communications transmitter may be a transmitter associated with a cellular terrestrial and/or satellite radioterminal, a cellular satellite, a cellular base station, an Ancillary Terrestrial Component (ATC) and/or any other cellular and/or non-cellular system element. The filter may be any type of filter such as, for example, band-pass, notch, low-pass, high-pass, band-stop and/or any combination thereof and/or any other type of filter.

Figure 4:
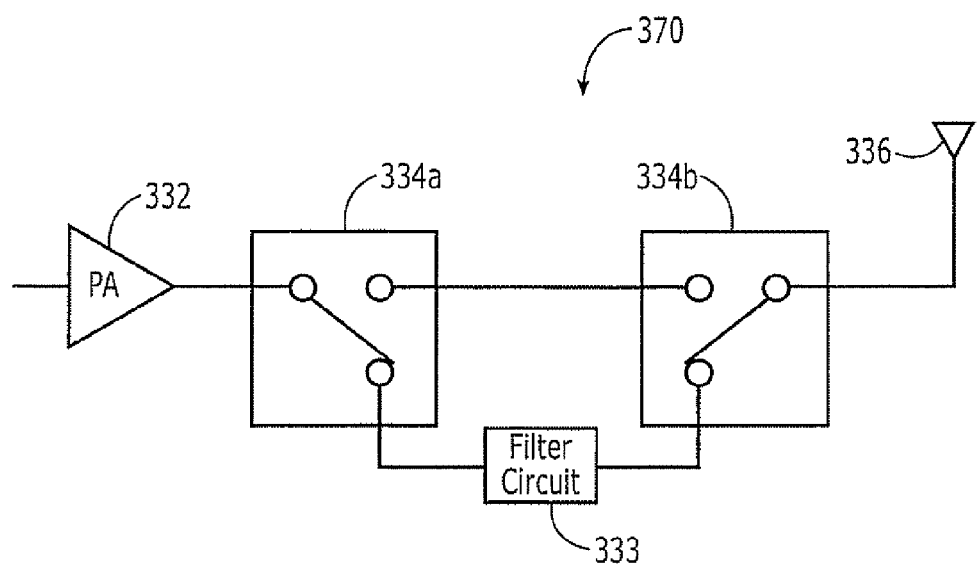
FIGS. 4-6 are schematic illustrations of transmitter circuits according to some embodiments of the invention.
Figure 5:
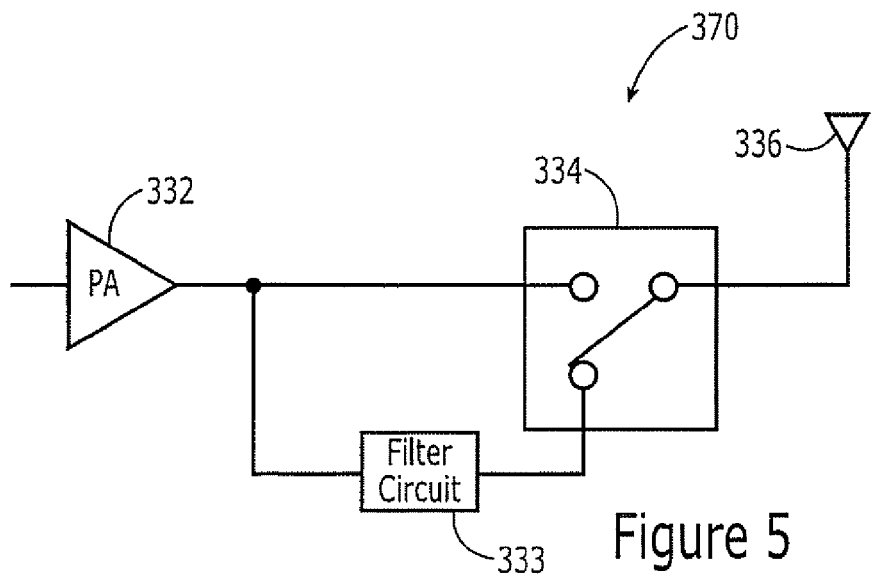
Figure 6:
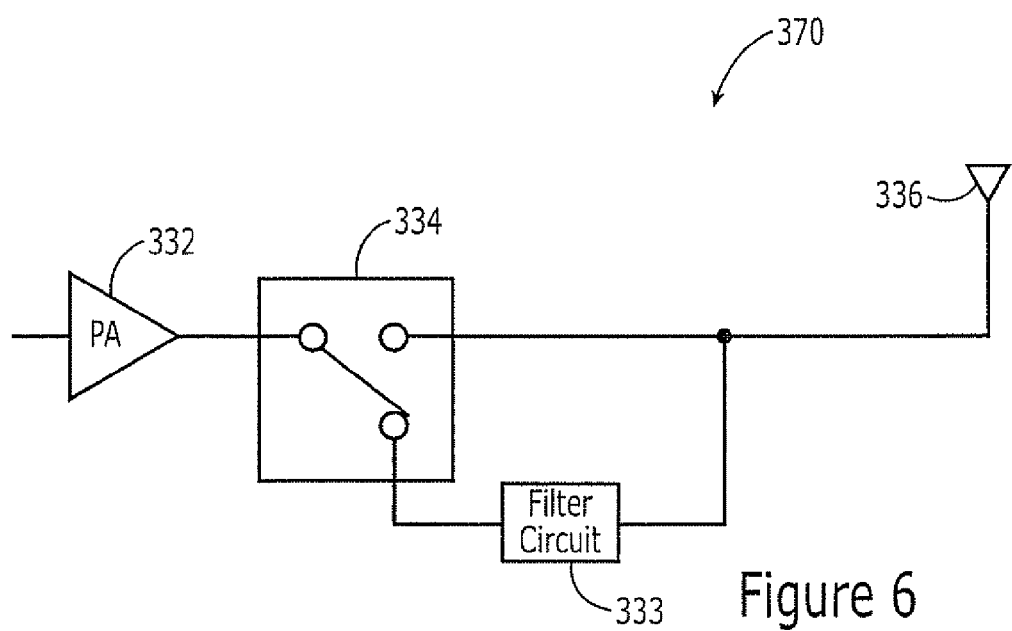

In some embodiments, the filter is provided at an output of a Power Amplifier (PA) of the transmitter. In other embodiments, the filter is provided prior to the PA. In further embodiments, the filter is distributed prior to and after the PA and/or between an input and an output of the PA. FIGS. 4 through 6 illustrate switching arrangements/configurations that may be used with a filter. However, other switching arrangements/configurations may also be used instead of and/or in combination with the arrangements/configurations illustrated in FIGS. 4 through 6.

According to exemplary embodiments of the invention, responsive to a frequency content of a signal that a communications transmitter transmits, or is about to transmit, a filter is either switched-in or switched-out of a transmitter chain of the communications transmitter. The frequency content of the signal may, in some embodiments, be a Radio Frequency (RF) content of the signal. Accordingly, in some embodiments of the invention, at least a first communications signal having a frequency content with a separation distance (i.e., a frequency separation distance) that is equal to and/or greater than a predetermined frequency separation distance relative to a predetermined band of frequencies (such as, for example, a GPS/GLONASS band of frequencies and/or an Inmarsat band of frequencies), may not be subjected to the filter (i.e., the filter may be switched-out of the transmitter chain of the transmitter) and at least a second communications signal having a frequency content with a separation distance that is less than the predetermined frequency separation distance relative to the predetermined band of frequencies may be subjected to the filter. In other embodiments of the invention, at least a first signal (i.e., communications carrier) having a frequency content with a separation measure (i.e., a frequency separation measure/distance) that is equal to a first frequency separation measure relative to a predetermined band of frequencies (such as, for example, a GPS/GLONASS band of frequencies and/or an Inmarsat band of frequencies), may be subjected substantially to a first filter and at least a second signal (i.e., communications carrier) having a frequency content with a separation measure that is equal to a second frequency separation measure relative to the predetermined band of frequencies may be subjected substantially to a second filter. In some embodiments, the first filter may differ from the second filter in at least one characteristic, such as, for example, a frequency response characteristic (i.e., attenuation vs. frequency and/or a phase vs. frequency characteristic). As used herein, the term "subjected substantially to" means "impacted mostly by."

For example, in an ancillary terrestrial network that uses L-band satellite frequencies, a transmitter filter may be selectively switched in a transmitter chain or out of the transmitter chain depending on a communications carrier frequency of the L-band frequency or frequencies that is/are being transmitted by a transmitter, and a proximity thereof to a GPS/GLONASS and/or other band of frequencies, that warrants a pre-determined level of interference protection, that is proximate to and/or is contained in the L-band. Downlink (or forward link) frequencies and/or uplink (or return link) frequencies may thereby be used by a communications transmitter, such as, for example, a communications transmitter of a radioterminal, a communications transmitter of a satellite and/or a communications transmitter of an ancillary terrestrial component, even though these frequencies may be close or adjacent to the GPS/GLONASS band of frequencies and/or the other band of frequencies that warrants the pre-determined level of interference protection, by selectively switching in or out of the communications transmitter chain a filter based on the particular carrier frequency that is being transmitted by the communications transmitter chain.

As used herein, the phrase "selectively switching in or out of the communications transmitter chain a filter based on the particular carrier frequency that is being transmitted by the communications transmitter chain" means electrically and/or electro-mechanically selectively switching in or out. In accordance with some embodiments of the invention, "selectively switching in or out of the communications transmitter chain a filter based on the particular carrier frequency that is being transmitted by the communications transmitter chain" means having configured within the communications transmitter chain a plurality of band reject and/or notch filters, differing therebetween in a frequency response characteristic, to thereby impose a variable (i.e., different) level of attenuation to at least some out-of-channel emissions of a signal that is being transmitted by the communications transmitter chain, responsive to a carrier frequency value associated with the signal that is being transmitted by the communications transmitter chain.

Switching a filter in, responsive to a proximity of a frequency content of a communications carrier being transmitted to a band of frequencies that warrants a predetermined level of interference protection, and configuring the filter at an output and/or input of an amplification stage of the transmitter chain that is transmitting the carrier, may, in accordance with some embodiments of the invention, reduce a spectral re-growth associated with the amplification stage, reduce an out-of-channel and/or out-of-band emission and/or reduce an interference/noise level into the band of frequencies that warrants the predetermined level of interference protection. It will be understood by those having skill in the art that embodiments of the present invention may be applied to any protocol and/or air interface that employs a plurality of carriers including, but not limited to, TDMA, CDMA, GSM, WiMAX, WCDMA and/or any other protocols/air interfaces that is/are used in cellular communications.

FIG. 1 is a schematic illustration of different frequency bands used by a wireless communications system and another communications system in some embodiments according to the invention. According to FIG. 1, the wireless communications system is configured to use a frequency band $f_{BATC}$ used by the system operator to provide communications services to users. The frequency band $f_{BATC}$ can include a carrier signal $f_{CATC}$ It will be understood that the carrier signal $f_{CATC}$ includes a frequency content which can be the fundamental frequency of the carrier signal $f_{CATC}$ or the carrier signal $f_{CATC}$ as well as the data that is used to modulate the carrier signal $f_{CATC}$.

Still referring to FIG. 1, a second band of frequencies $f_{B0}$ is used by another communications system operator to provide services to users thereof. It will be understood that the services provided by the other communications system can be provided using a respective carrier signal $f_{C0}$ as shown. It will be understood that the other communications system can be any communications system other than the wireless communications system.

The carrier signal $f_{CATC}$ and the carrier signal $f_{C0}$ used by the other communications system are separated by a frequency separation distance $f_{SD}$. In some embodiments according to the invention, the frequency separation distance is the frequency difference between the carrier signal $f_{CATC}$ and the carrier signal $f_{C0}$. In other embodiments according to the invention, the frequency separation distance is a frequency difference between the carrier signal $f_{CATC}$ and an adjacent lower or higher frequency limit of the other communications system. In still other embodiments according to the invention, the frequency separation difference is the frequency difference between adjacent upper/lower boundaries of the respective frequency bands, which is designated in FIG. 1 as $f'_{SD}$.

Figure 2:
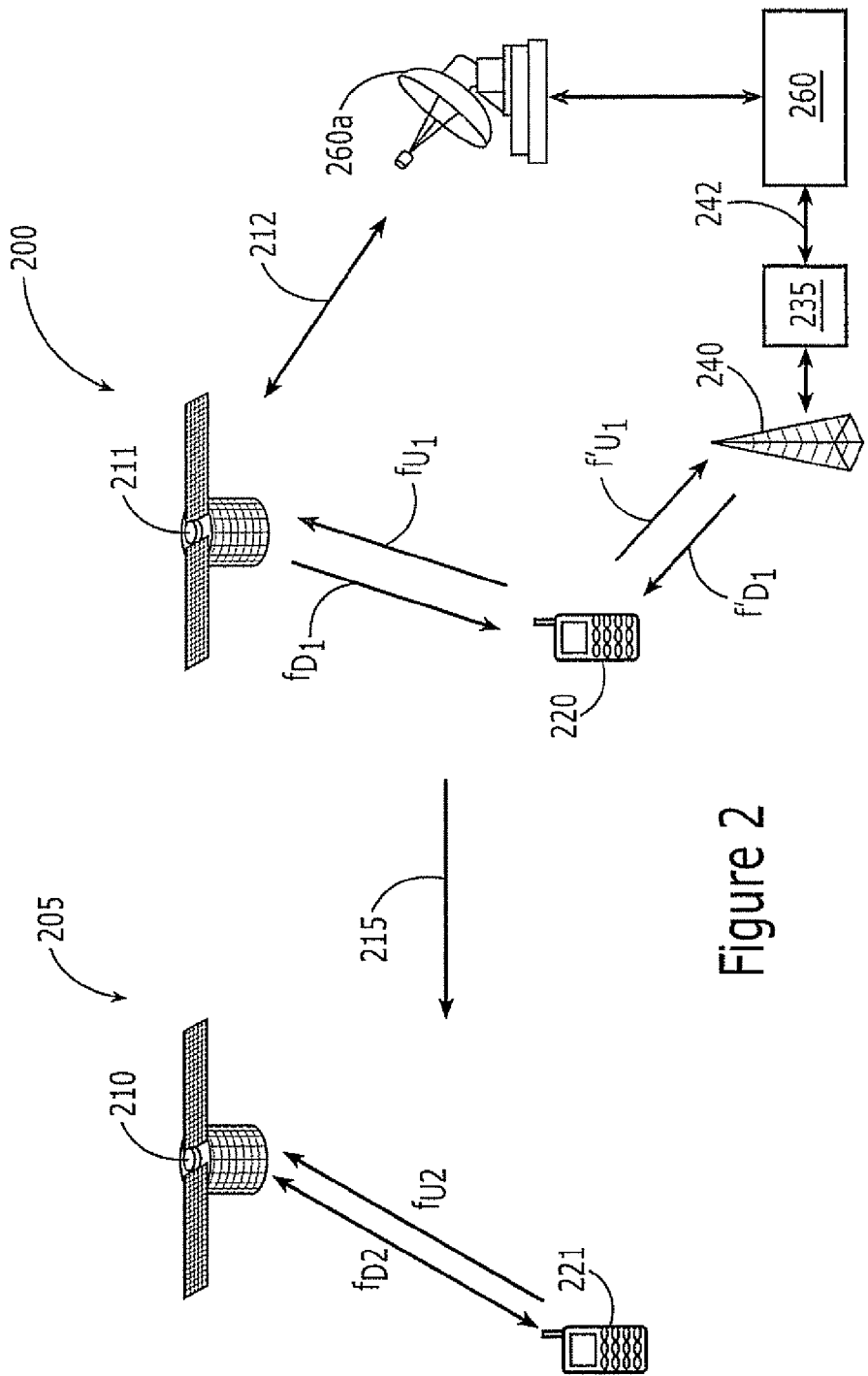
FIG. 2 is a schematic illustration of a wireless communications system and another communications system utilizing the respective frequency bands shown in FIG. 1.

FIG. 2 is a schematic illustration of a cellular satellite radiotelephone system 200 of a first operator that communicates with space based and/or terrestrial components thereof using the respective frequency band $f_{BATC}$ and a second system 205 of a second operator using the respective frequency band $f_{B0}$ according to some embodiments of the invention As shown in FIG. 2, the system 200 includes at least one Space-Based Component (SBC) 211, such as a satellite, to communicate with a radiotelephone 220 served by the first operator. It will be understood that the radiotelephone 220 serviced by the first system 200 can represent a plurality of radiotelephones.

In some embodiments according to the invention, the systems 200, 205 are operated by different operators. Moreover, the systems 200, 205 are separately licensed for operation in the different frequency bands, respectively as shown in FIG. 1.

Embodiments of satellite radiotelephone system 200 according to the invention can include at least one gateway 260 that can include an antenna 260a and an electronics system that can be connected to other networks (not shown) including terrestrial wireline and/or other radiotelephone networks that may be configured to provide circuit-switched and/or packet-switched services. The gateway 260 communicates with the SBC 211 over a satellite feeder link 212 and may communicate with an Ancillary Terrestrial Network (ATN) 235 over a wireless and/or wireline communications link 242. The ATN 235 can include at least one Ancillary Terrestrial Component (ATC) 240, which may include an antenna and an electronics system (not shown).

The SBC 211 is configured to transmit wireless communications to the radiotelephone 220 in a satellite footprint. In particular, the SBC 211 is configured to transmit communications to the radiotelephone 220 using a downlink frequency $f_{D1}$ and configured to receive wireless communications from the radiotelephone 220 over a satellite uplink frequency $f_{U1}$. The radiotelephone 220 is configured to communicate with the ATC 240 over satellite downlink frequency $f_{D1}$ and/or satellite uplink frequency $f'_{U1}$. In some embodiments of the invention, the radiotelephone 220 and the ATC 240 are configured to communicate therebetween using a Time Division Duplex (TDD) air interface protocol such as, for example, WiMAX. The frequencies $f_{D1}$, $f_{U1}$, $f'_{D1}$, and $f'_{U1}$, are included in the frequency band $f_{BATC}$ that is allocated to the first operator as shown in FIG. 1.

The system 205 includes at least one SBC 210, such as a satellite, to communicate with radiotelephone 221 operated by the second operator. The SBC 210 can communicate with the radiotelephone 221 via one or more respective satellite radiotelephone forward link (downlink) frequencies $f_{D2}$ and may receive communications from the radiotelephone 221 over respective satellite radiotelephone return link (uplink) frequencies $f_{U2}$. In some embodiments according to the invention, the radiotelephone 221 only receives from the SBC 210 and does not transmit using the uplink frequencies $f_{U2}$, such as, for example, in a GPS system. The frequencies $f_{U2}$, and $f_{D2}$ are included in the frequency band $f_{B0}$ that is allocated to the second operator as shown in FIG. 1. The system 205 can include other components not shown and the radiotelephone 221 serviced by the system 205 can represent a plurality of radiotelephones.

According to FIG. 2, the radioterminal 220, ATC 240 and/or SBC 211 using the uplink/downlink frequencies (allocated to the first operator) to communicate can generate an interference component 215 at the radioterminal 221 and/or the SBC 210.

In some embodiments according to the invention, transmission of a carrier signal $f_{CATC}$ can selectively apply filtering based on a frequency content of the carrier signal $f_{CATC}$. In particular, filtering can be selectively applied based on a frequency separation distance between the frequency content of the carrier signal $f_{CATC}$ and the frequency band $f_{B0}$ used by the other communications system to provide services. For example, as shown in FIG. 1, the frequency separation distance can be measured between the respective carrier signals of the different communications systems or between one of the carrier frequencies and an upper/lower maximum frequency for the other communications system. In still farther embodiments according to the invention, the frequency separation distance may be measured between the adjacent, upper/lower maximum frequencies for the frequency bands ($f'_{SD}$). As described herein, the selective filtering can be used in a transmitter in any of the components of system 200 (such as a radio terminal 240, an SBC 211 and/or a base station 240) in some embodiments according to the invention.

Figure 3:
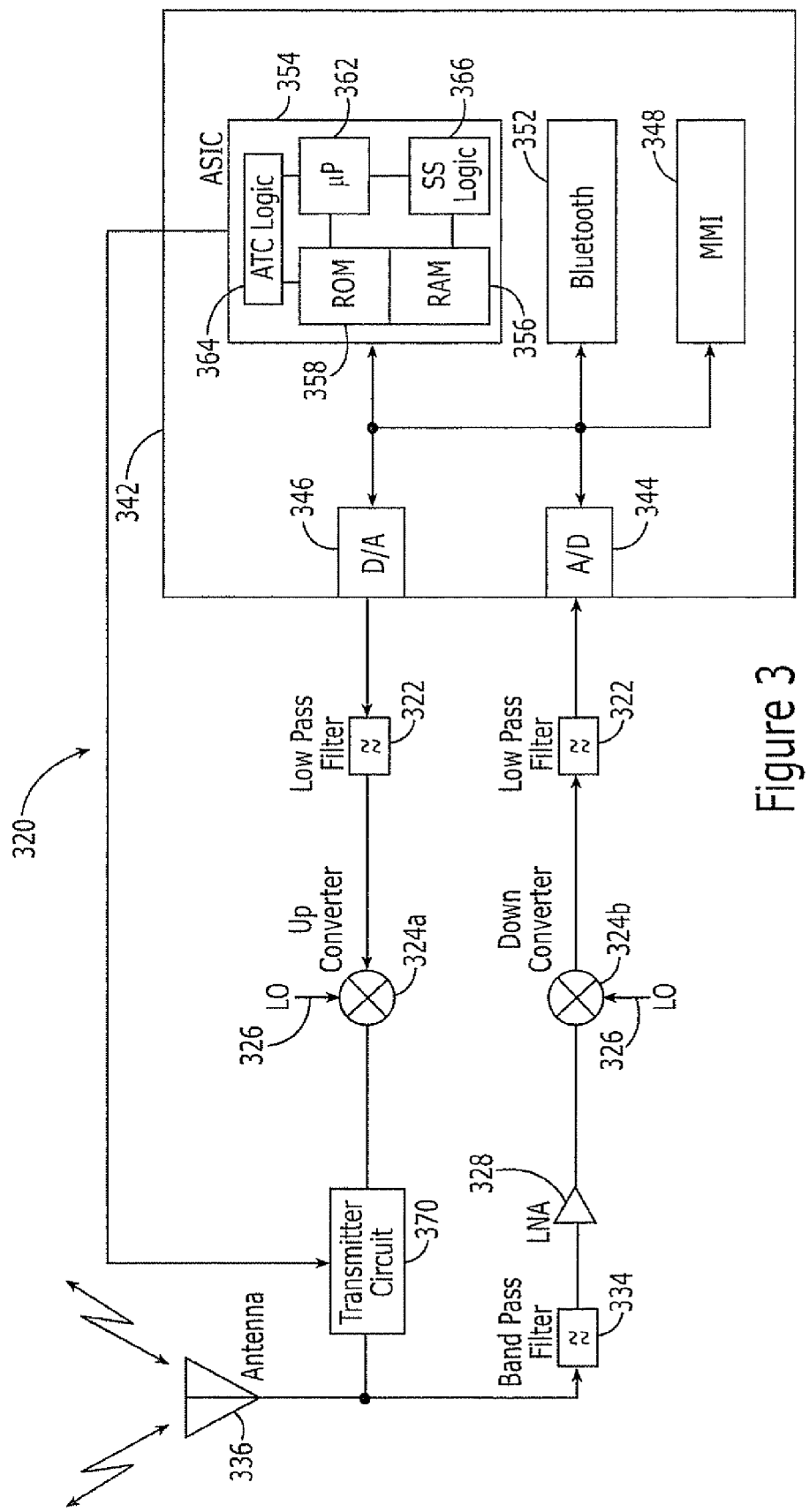
FIG. 3 is a block diagram that illustrates transmitter circuits included in transmitters according to some embodiments of the invention.

FIG. 3 is a block diagram of a Radio Frequency (RF) chain including low pass filters 322, up and down converters 324a, 324b, Local Oscillators (LO) 326, Low Noise Amplifier (LNA) 328, a transmitter circuit 370, band-pass filter(s) 334 and an antenna 336, that may be used in a transmitter included in any component of system 200 described herein to provide selective filtering of transmission carrier signals based on frequency content of the carrier signal in some embodiments according to the invention.

The RF chain may be operated in conjunction with a baseband processor 342 that can include an analog-to-digital converter (A/D) 344, a digital-to-analog converter (D/A) 346 and a Man-Machine Interface (MMI) 348. An optional Bluetooth interface 352 may be provided. An Application-Specific Integrated Circuit (ASIC) 354 may include thereon Random Access Memory (RAM) 356, Read-Only Memory (ROM) 358, a microprocessor (μP) 362, logic for ancillary terrestrial communications (ATC Logic) 364 and logic for space-based communications (Space Segment Logic or SS Logic) 366. The SS Logic 366 can be used to accommodate satellite-unique requirements over and above those of cellular, ATC or PCS, such as a satellite-unique vocoder, a satellite forward error correction coding scheme, a satellite-unique interleaver, etc.

The transmitter circuit 370 may, in accordance with some embodiments of the invention, be configured to operate under the control of one or more of the components of the ASIC 354 and may be configured to selectively apply filtering to a transmission of a carrier signal in the band of frequencies used by the wireless communications system based upon a frequency separation distance between a frequency content of the carrier signal and a second band of frequencies allocated to the other communications system. In particular, the transmitter circuit 370 can be configured to include a filter, such as a notch and/or band-reject filter, in transmission of the carrier signal when the frequency separation distance is less than a predetermined threshold and can remove the filter from transmission of the carrier signal when the frequency separation distance is greater than the predetermined threshold.

It will be understood that in some embodiments according to the invention, the transmitter circuit 370 can be configured to change the filtering rather than include/remove the filter from the transmission. For example, in some embodiments according to the invention, the transmitter circuit 370 can be configured to change at least one characteristic of a filter that provides the filtering when the frequency separation distance becomes less than the predetermined threshold. In still other embodiments according to the invention, the transmitter circuit 370 can be configured to include a component in the filter or remove a component from the filter based on the frequency separation distance. For example, in some embodiments according to the invention, the filter characteristic may be changed to attenuate a frequency content of the transmission for content that is within the frequency separation distance.

It will be understood that selectively applying filtering (or including/removing or changing the filtering) can be based on the frequency separation distance to allow reduced interference from the system in the other communications system, particularly when the frequency separation distance between the frequency content of the carrier signal used by the wireless system and the frequency band of the other communication system becomes so low that a specified threshold of protection would be violated. In particular, the selective filtering can be used when the interference 215 that may otherwise be generated would exceed the specified threshold that provides interference protection for the other communications system, such as a GPS system.

In still other embodiments according to the invention, selectively applying filtering to the transmission of the carrier signal can include applying two different filters based on the frequency separation distance. For example, the transmitter circuit 370 can be configured to provide a first filter for transmission of the carrier signal when the frequency separation distance is greater than the predetermined threshold and to provide the first and a second filter in transmission of the carrier signal when the frequency separation distance is less than the predetermined threshold.

FIG. 4 is a schematic illustration of a transmitter circuit 370 according to some embodiments of the invention. As shown in FIG. 4, a power amplifier 332 receives an input signal from the up converter 324a including the transmitted carrier signal of the band of frequencies $f_{BATC}$ used by the wireless communications system. The power amplifier 332 amplifies the input signal to generate an amplified signal, which is provided to a switch circuit 334a that operates under the control of the processor 342. In particular, the processor 342 can set the switch circuit 334a so that the amplified signal is coupled to a filter circuit 333 or directly to a switch circuit 334b. The output of the filter circuit 333 is provided to the switch circuit 334b so that the processor 342 can select either the filter circuit 333 output or the amplified signal provided directly from the switch circuit 334a to be provided to the antenna 336.

In operation, the processor 342 can configure the switch circuits 334a and 334k to include the filter circuit 333 in the transmission path between the output of the power amplifier 332 and the antenna 336 if for example, the frequency separation distance between the frequency content of the carrier signal $f_{CATC}$ and the band of frequencies used by the other communication system is less than a predetermined threshold. Alternatively, the processor 342 can configure the switch circuits 334a and 334b to remove the filter circuit 333 from the transmission path so that the output of the power amplifier 332 is directly coupled to the antenna 336 when, for example, the frequency separation distance is greater than the predetermined threshold.

FIG. 5 is a schematic illustration of the transmitter circuit 370 according to some embodiments of the invention. As shown in FIG. 5, the input signal is amplified by the power amplifier 332 to provide an amplified signal to both the filter circuit 333 and the switch circuit 334. The filter circuit 333 provides a filtered output to the switch circuit 334. In operation, the processor 342 can configure the switch 334 to select either the amplified signal from the power amplifier 332 or the filtered output from the filter circuit 333 to be provided to the antenna 336. Accordingly, the transmitter circuit 370 can be configured to include the filter circuit 333 when, for example, the frequency separation distance is less than the predetermined threshold or to remove the filter circuit 333 from the transmission path when the frequency separation distance is greater than the predetermined threshold.

FIG. 6 is a block diagram that illustrates the transmitter circuit 370 according to some embodiments of the invention. As shown in FIG. 6, the input signal is amplified by the power amplifier 332 to provide an amplified signal to the switch circuit 334. The switch circuit is also connected to both the filter circuit 333 and to the antenna 336. In operation, the processor 342 can control the switch circuit 334 to couple the amplified signal from the power amplifier 332 to either the filter circuit 333 to provide a filtered output to the antenna 336 or to couple the amplified, signal from the power amplifier 332 directly to the antenna 336. Accordingly, the transmitter circuit 370 can be configured to include the filter circuit 333 in the transmission path if the frequency separation distance is less than the predetermined threshold or, alternatively, to remove the filter circuit 333 from the transmission path if the frequency separation distance is greater than the predetermined threshold.

Although FIGS. 4-6 illustrate the inclusion/removal of the filter circuit 333 in/from the transmission path, it will be understood that the transmission circuit 370 can also be configured to change the filtering, based on the frequency separation distance, rather than remove the filtering. For example, the processor 342 can modify the filter circuit 333 to either include or remove a component therefrom based on the frequency separation distance so that at least one characteristic of the filter is changed. Furthermore, the processor 342 may operate to include a different filter circuit in the transmission path (rather than changing a single filter circuit or entirely removing a single filter circuit). For example, in some embodiments according to the invention, the transmission circuit 370 may be configured to include a first filter in the transmission path if the frequency separation distance is less than the predetermined threshold and to include a second filter circuit if the frequency separation distance is greater than the predetermined threshold.

Figure 7:
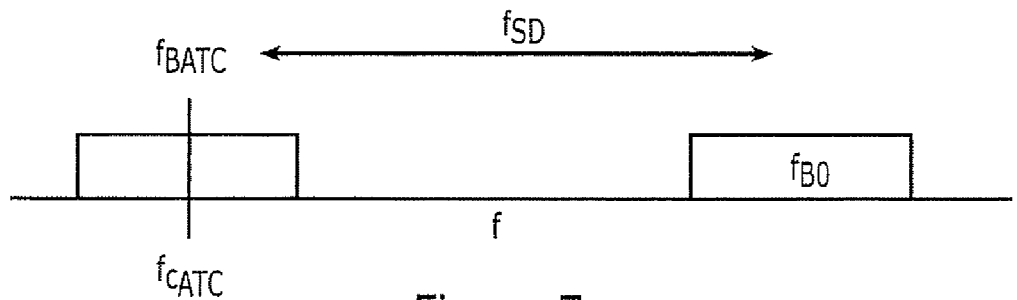
FIGS. 7-10 are schematic illustrations of frequency bands used by wireless communications systems and other communications systems having frequency separation distances therebetween according to some embodiments of the invention.

FIG. 7 is a schematic illustration of respective frequency bands used by the wireless communications system and another communications system according to some embodiments of the invention. In particular, FIG. 7 illustrates that the frequency band $f_{BATC}$ used by the wireless communications system has a frequency separation distance $f_{SD}$ relative to the frequency band $f_{BO}$ used by the other communications system. According to FIG. 7, the selective filtering can be applied to transmission of the carrier frequency $f_{CATC}$ using a low-pass, notch, band-pass, band-reject and/or other filter if the frequency separation distance $f_{SD}$ is less than the predetermined threshold when the frequency band $f_{BO}$ is above the frequency band $f_{BATC}$ and the frequency separation distance $f_{SD}$ is less than the predetermined threshold.

Figure 8:
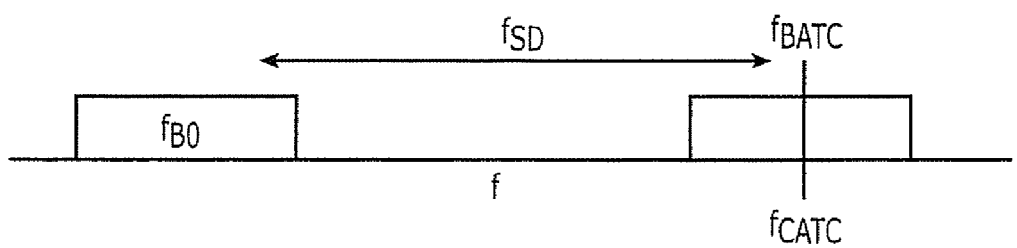

FIG. 8 is a schematic illustration of some embodiments according to the invention where the frequency band $f_{BATC}$ for the wireless communications system is above the frequency band $f_{B0}$. Accordingly, transmission of the carrier signal $f_{CATC}$ according to some embodiments of the invention can selectively apply high-pass, notch, band-pass, band-reject and/or other filtering if the frequency separation distance is less than the predetermined threshold. Alternatively, if the frequency separation distance is greater than the predetermined threshold, the filtering may be removed and/or altered.

Figure 9:
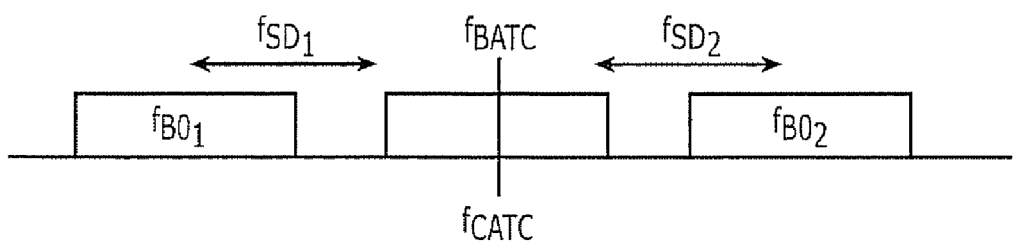

FIG. 9 is a schematic illustration of embodiments according to the invention wherein the frequency band $f_{BATC}$ utilized by the wireless communications system is located between first and second frequency bands $f_{B01}$ and $f_{B02}$ utilized by the other communications system(s). Accordingly, transmission of the carrier signal $f_{CATC}$ can be selectively filtered using a band-pass, notch, band-reject and/or other filter it for example, the respective frequency separation distances between the frequency band $f_{B01}/f_{BATC}$ and $f_{B02}/f_{BATC}$ is/are less than the predetermined threshold. If only one of the frequency separation distances is less than the predetermined threshold, the transmitter circuit may employ only a portion of the band-pass, notch, band-reject and/or other filter or one of the filters described above in reference to FIGS. 7 and 8. In still other embodiments according to the invention, if both frequency separation distances $f_{SD1}$ and $f_{SD2}$ are greater than the predetermined threshold, the band-pass, notch, band-reject and/or other filter can be removed from the transmission path or altered.

Figure 10:
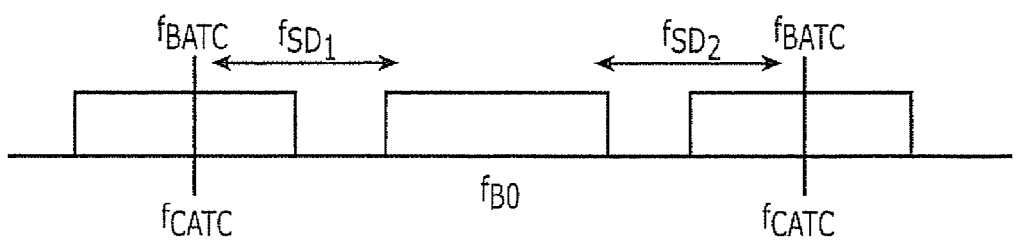

FIG. 10 is a schematic illustration of frequency bands $f_{BATC}$ used by the wireless communications system located above and below (in frequency space) a frequency band $f_{B0}$ used by the other communications system in some embodiments according to the invention. In particular, transmission of a carrier signal $f_{CATC}$ can be selectively filtered using a band-stop, band-reject, notch, low-pass, high-pass and/or other filter if at least one of the frequency separation distances $F_{SD1}$ and $f_{SD2}$ is less than a predetermined threshold or respective thresholds for each. In still other embodiments according to the invention, if both frequency separation distances $f_{SD1}$ and $f_{SD2}$ are greater than the predetermined threshold, the band-stop, band-reject, notch, low-pass, high-pass and/or other filter can be removed from the transmission path or altered.

It will be understood that the filtering described above may operate on a frequency content of the carrier signal to attenuate the frequency content as a function of the frequency separation distance. For example, in some embodiments according to the invention, only a portion of the frequency content of the carrier signal may be less than the frequency separation distance so that only that portion of the frequency content may be filtered or may be filtered differently than the portions which are greater than the threshold. Furthermore, different portions of the frequency content that are less than the threshold may be filtered differently. For example, portions of frequency content that are closer to the other frequency bands to be protected may be filtered to a greater degree than other portions which maintain a greater frequency separation distance but are nonetheless still less than the threshold.

According to some embodiments of the invention, the wireless communications system may be operated by Mobile Satellite Ventures, LP ("MSV") and the other system (or respective operator) may be GPS, GLONASS, Inmarsat, Globalstar, Iridium, XM-Satellite Radio, Sirius Satellite Radio, TerreStar and/or ICO. It will be appreciated by those skilled in the art that although the principles, systems and/or methods described herein have been described in the context of specific illustrative embodiments relating to first and second satellite systems/operators, the principles, systems and/or methods of the present invention may be applied to any first and second systems. For example, in some embodiments according to the invention, the first system/operator may be a satellite system/operator and the second system/operator may be a cellular/PCS system/operator. In other embodiments, the first system/operator may be a cellular/PCS system/operator and the second system/operator may be a cellular/PCS system/operator, etc.

In the specification and the Figures, there have been disclosed embodiments of the invention and, although specific terms are employed, they are used in a generic and descriptive sense only and not for purposes of limitation, the scope of the invention being set forth in the following claims.

What is claimed is:

1. A method of transmitting information in a wireless communications system comprising:
    a filter selectively applying in filtering to transmission of a carrier signal of a first band of frequencies of a wireless communications system based on a frequency separation distance between a frequency content of the carrier signal and a second band of frequencies allocated to a communications system other than the wireless communications system;
    wherein selectively applying filtering to transmission of a carrier signal comprises:
        providing the filtering when the frequency separation distance is greater than a predetermined threshold; and
        changing the filtering when the frequency separation distance is less than the predetermined threshold to reduce interference in the second band from the carrier signal; and
    wherein changing the filtering comprises changing at least one characteristic of the filter that provides the filtering.

2. A method according to claim 1 wherein the carrier signal of the first band of frequencies comprises a carrier signal for a wireless communications system forward link or a wireless communications system return link and the second band of frequencies comprises a GPS frequency band or a GLONASS frequency band.

3. A method according to claim 1 wherein the second band of frequencies is specified to have a predetermined level of interference protection.

4. A method according to claim 1 wherein the first band of frequencies comprises one of a plurality of air interfaces supported by the wireless communications system.

5. A method of transmitting information in a wireless communications system comprising:
    a filter selectively applying filtering to transmission of a carrier signal of a first band of frequencies of a wireless communications system based on a frequency separation distance between a frequency content of the carrier signal and a second band of frequencies allocated to a communications system other than the wireless communications system;
    wherein selectively applying filtering to transmission of a carrier signal comprises:
        providing the filtering when the frequency separation distance is greater than a predetermined threshold; and changing the filtering when the frequency separation distance is less than the predetermined threshold to reduce interference in the second band from the carrier signal; and wherein changing the filtering comprises including/removing at least one component in/from the filter.

6. A method according to claim 5 wherein the carrier signal of the first band of frequencies comprises a carrier signal for a wireless communications system forward link or a wireless communications system return link and the second band of frequencies comprises a GPS frequency band or a GLONASS frequency band.

7. A method according to claim 5 wherein the second band of frequencies is specified to have a predetermined level of interference protection.

8. A method according to claim 5 wherein the first band of frequencies comprises one of a plurality of air interfaces supported by the wireless communications system.

9. A transmitter circuit in an Ancillary Terrestrial Component (ATC) base station of a wireless communications system, the circuit comprising:

a power amplifier circuit configured to amplify radiofrequency communications signals in a satellite frequency band for transmission;

a filter circuit configured to filter the transmission of a carrier signal in the satellite frequency band when coupled to the power amplifier circuit;

a switch circuit coupled to an input and/or output of the filter circuit;

an antenna coupled to the output of the filter circuit and/or the power amplifier circuit; and a control circuit coupled to the switch circuit, the control circuit configured to operate the switch based on a frequency content of the carrier signal in the satellite frequency band transmitted by the transmitter circuit;

wherein the control circuit is further configured selectively couple the filter circuit to the power amplifier circuit and/or antenna to filter transmission of the carrier signal of a first band of frequencies of the wireless communications system based on a frequency separation distance between the frequency content of the carrier signal and a second band of frequencies allocated to a communications system other than the wireless communications system; and wherein the switch circuit is coupled to the input and output of the filter circuit, wherein the control circuit is configured to couple the power amplifier circuit to the input of the filter circuit and couple the output of the filter to the antenna via the switch circuit if the frequency separation distance is less than a predetermined threshold and configured to decouple the filter circuit from the power amplifier circuit and from the antenna if the frequency separation distance is greater than the predetermined threshold.

10. A transmitter circuit in an Ancillary Terrestrial Component (ATC) base station of a wireless communications system, the circuit comprising:

a power amplifier circuit configured to amplify radiofrequency communications signals in a satellite frequency band for transmission;

a filter circuit configured to filter the transmission of a carrier signal in the satellite frequency band when coupled to the power amplifier circuit;

a switch circuit coupled to an input and/or output of the filter circuit;

an antenna coupled to the output of the filter circuit and/or the power amplifier circuit; and a control circuit coupled to the switch circuit, the control circuit configured to operate the switch based on a frequency content of the carrier signal in the satellite frequency band transmitted by the transmitter circuit;

wherein the control circuit is further configured selectively couple the filter circuit to the power amplifier circuit and/or antenna to filter transmission of the carrier signal of a first band of frequencies of the wireless communications system based on a frequency separation distance between the frequency content of the carrier signal and a second band of frequencies allocated to a communications system other than the wireless communications system; and wherein the switch circuit is coupled to the output of the filter circuit, wherein the control circuit is configured to couple the power amplifier circuit to the antenna through the filter circuit if the frequency separation distance is less than a predetermined threshold and configured to decouple the output of the filter circuit from the antenna if the frequency separation distance is greater than the predetermined threshold.

11. A transmitter circuit in an Ancillary Terrestrial Component (ATC) base station of a wireless communications system, the circuit comprising:

a power amplifier circuit configured to amplify radiofrequency communications signals in a satellite frequency band for transmission;

a filter circuit configured to filter the transmission of a carrier signal in the satellite frequency band when coupled to the power amplifier circuit;

a switch circuit coupled to an input and/or output of the filter circuit;

an antenna coupled to the output of the filter circuit and/or the power amplifier circuit; and a control circuit coupled to the switch circuit, the control circuit configured to operate the switch based on a frequency content of the carrier signal in the satellite frequency band transmitted by the transmitter circuit;

wherein the control circuit is further configured selectively couple the filter circuit to the power amplifier circuit and/or antenna to filter transmission of the carrier signal of a first band of frequencies of the wireless communications system based on a frequency separation distance between the frequency content of the carrier signal and a second band of frequencies allocated to a communications system other than the wireless communications system; and wherein the switch circuit is coupled to the input of the filter circuit, wherein the control circuit is configured to couple the power amplifier circuit to the antenna through the filter circuit if the frequency separation distance is less than a predetermined threshold and configured to decouple an input of the filter circuit from the power amplifier circuit if the frequency separation distance is greater than the predetermined threshold.

* * * * *

UNITED STATES PATENT AND TRADEMARK OFFICE
CERTIFICATE OF CORRECTION

PATENT NO. : 8,190,114 B2
APPLICATION NO. : 11/457881
DATED : May 29, 2012
INVENTOR(S) : Karabinis et al.

Page 1 of 1

It is certified that error appears in the above-identified patent and that said Letters Patent is hereby corrected as shown below:

In the Claims:

Column 13, Claim 9, Line 36:
    Please correct "wherein the control circuit is further configured selectively"
        to read: -- wherein the control circuit is further configured to selectively --

Column 14, Claim 10, Line 9:
    Please correct "wherein the control circuit is further configured selectively"
        to read: -- wherein the control circuit is further configured to selectively --

Column 14, Claim 11, Line 44:
    Please correct "wherein the control circuit is further configured selectively"
        to read: -- wherein the control circuit is further configured to selectively --

Signed and Sealed this
Twenty-second Day of January, 2013

David J. Kappos
*Director of the United States Patent and Trademark Office*